Jan. 3, 1967    T. B. MEEK, JR., ET AL    3,295,795
HELICOPTER LANDING GEAR UNSAFE WARNING SYSTEM
Filed March 24, 1965    3 Sheets-Sheet 1

INVENTORS
THOMAS B. MEEK, JR.
STEPHEN W. SALAI
BY Vernon F. Hauschild
ATTORNEY

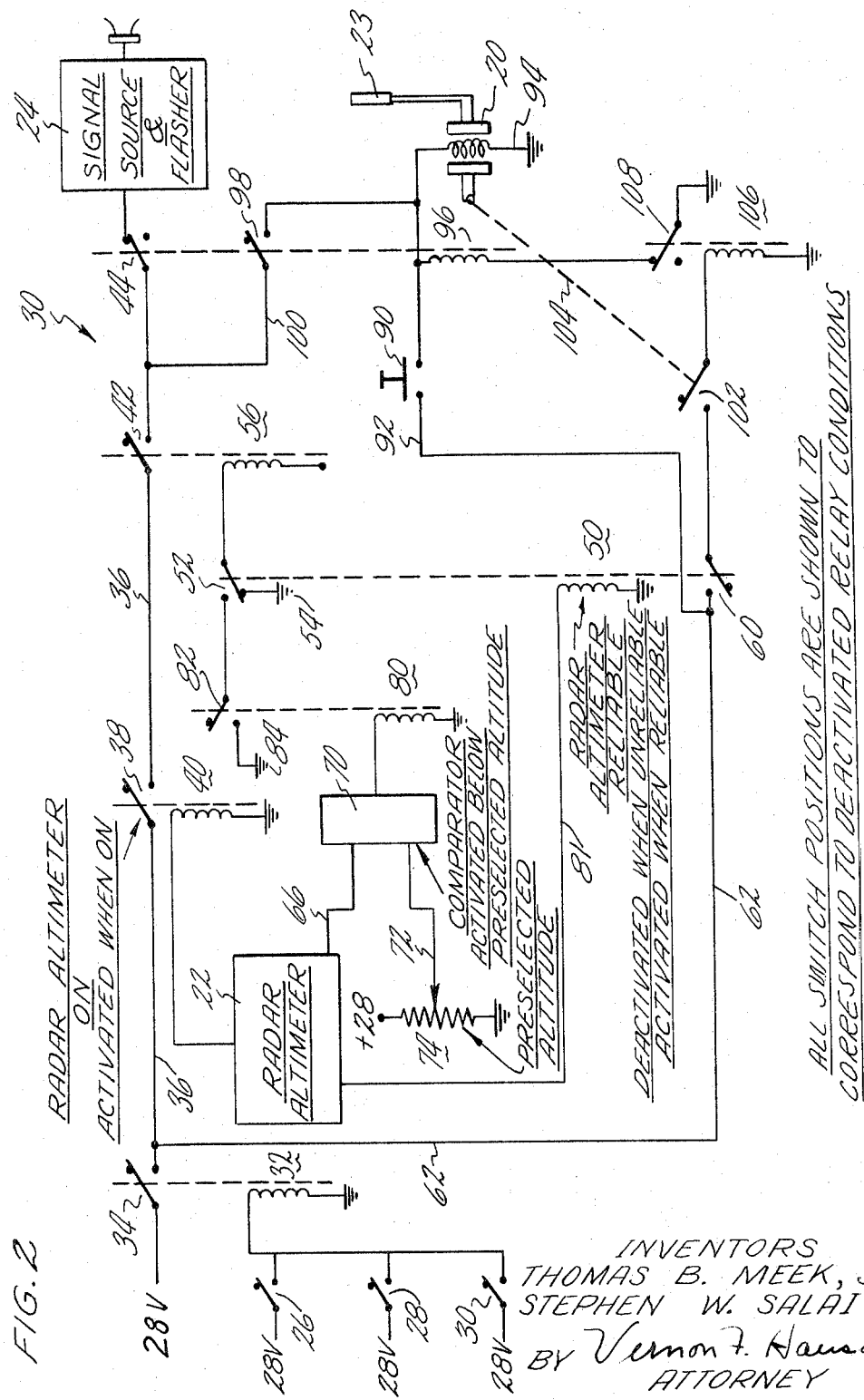

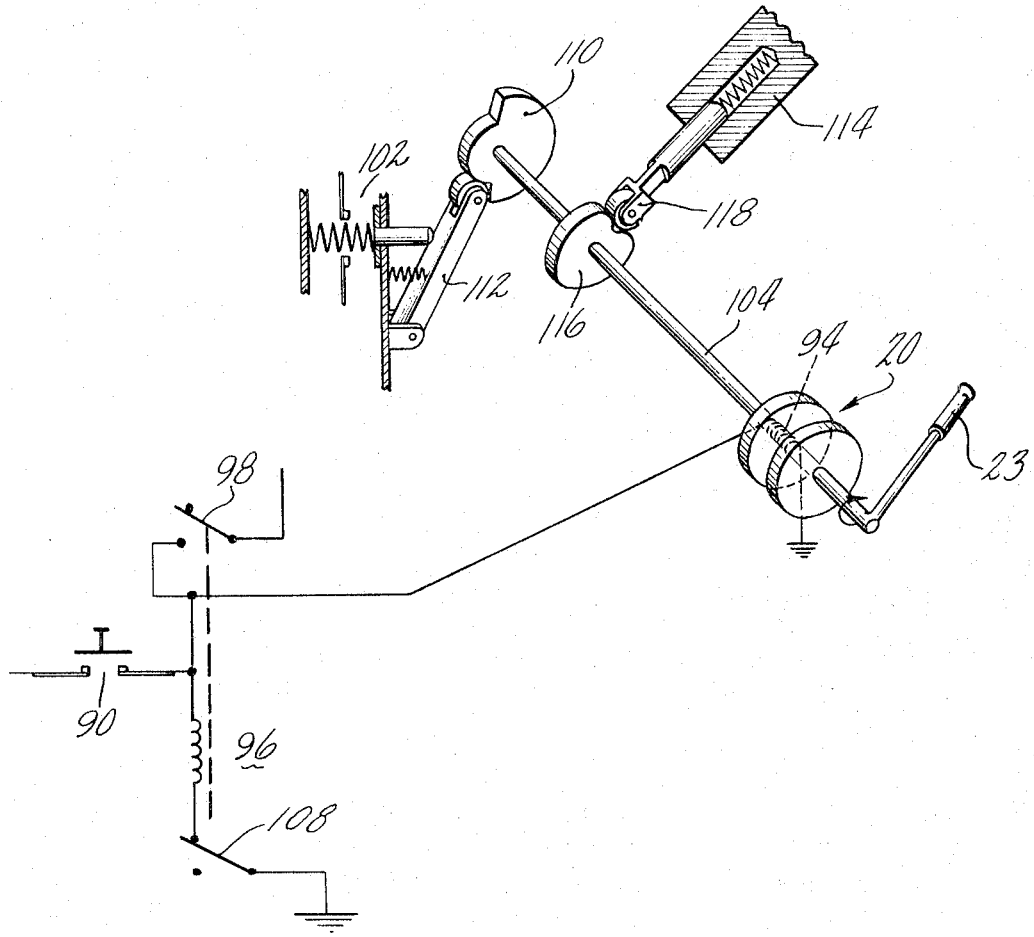

United States Patent Office 3,295,795
Patented Jan. 3, 1967

3,295,795
HELICOPTER LANDING GEAR UNSAFE
WARNING SYSTEM
Thomas B. Meek, Jr., Oxford, Conn., and Stephen W. Salai, Penfield, N.Y., assignors to United Aircraft Corporation, East Hartford, Conn., a corporation of Delaware
Filed Mar. 24, 1965, Ser. No. 442,315
13 Claims. (Cl. 244—17.17)

This invention relates to helicopters and more particularly to helicopter landing gear unsafe warning systems.

The helicopter landing operation cannot be characterized by a unique group of parameters as in fixed wing aircraft where several parameters can be sensed which completely define an intent to land; for example, power reduction from cruise, rate of descent, altitude and air speed are related to landing approach. In fixed wing aircraft, sequential monitoring of these parameters can be used to trigger a warning system should the aircraft not be in proper landing condition, for example, landing gear unlocked.

This series of pertinent parameters is not available in a helicopter landing because in a helicopter, the air speed may be zero at any altitude and landings can be made with or without power.

It is accordingly an object of this invention to teach a helicopter landing gear unsafe warning system which is a function of helicopter altitude, that is, helicopter distance above the earth, a function of altitude sensing means reliability and a function of the position or movement of the collective pitch control stick which the pilot uses to control helicopter altitude and hence helicopter ascent and descent and landing gear condition.

It is an object of this invention to teach a helicopter landing gear unsafe warning system which will warn the pilot when his landing gear is not down and locked as he descends below a preselected altitude.

It is a further object of this invention to teach a helicopter landing gear unsafe warning system which warns the pilot when his landing gear is not down and locked and when his altitude detection system is rendering an unreliable signal.

It is still a further object of this invention to teach a helicopter landing gear unsafe warning system which will warn the pilot that his landing gear is not down and locked and that neither the helicopter has descended below a preselected altitude or the altitude sensing device is rendering an unreliable signal and further, wherein the system includes provisions for the pilot to turn off the warning signal if he does not intend to land by depressing a reset button which automatically arms a clutch associated with the collective stick so that the warning system will be reactivated should the pilot depress the collective stick a predetermined amount so as to alter blade pitch to reduce altitude further.

It is still further object of this invention to teach a helicopter landing gear unsafe warning system which will warn the pilot when the helicopter is below a preselected altitude and which will automatically rearm when the helicopter thereafter ascends above this preselected altitude.

It is still a further object of this invention to teach a helicopter landing gear unsafe warning system which will be disconnected and made inoperative when the landing gear is down and locked.

It is still a further object of this invention to teach a helicopter landing gear unsafe warning system which may be operated in altitude mode so that the warning system will be activated whenever the helicopter descends below a preselected altitude or there is an unreliable altitude signal while the landing gears are not all down and locked. Further, wherein said warning signal can be deactivated or silenced by the pilot depressing a reset button which will place the system in the collective stick mode of operation so that depression of the collective stick will reactivate the warning system and, further, wherein once so reactivated in the collective stick mode of operation, the warning system reverts automatically to the altitude mode of operation.

Other objects and advantages will be apparent from the specification and claims and from the accompanying drawings which illustrate an embodiment of the invention.

In these drawings:

FIG. 2 is an electrical diagram illustrating our helicopter landing gear unsafe warning system; and FIG. 3 is a schematic representation of the collective stick, clutch, centering device and switch arrangements used with our helicopter landing gear unsafe warning system.

Figure 1:
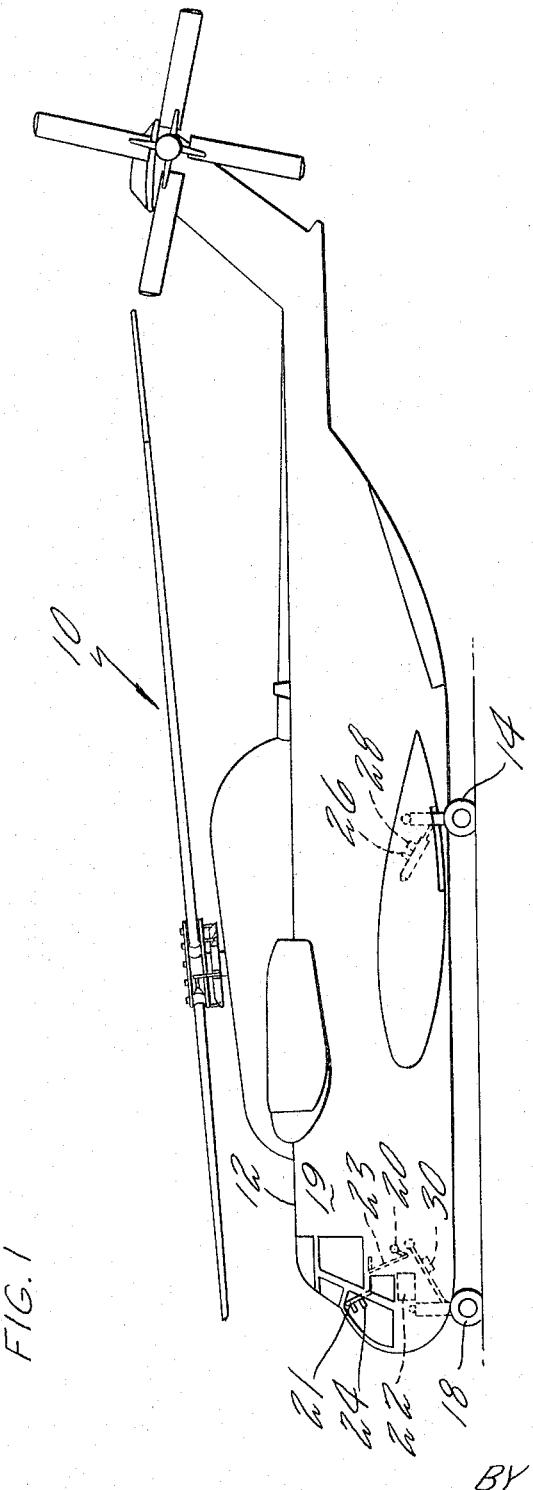
FIG. 1 is a fragmentary showing of a conventional helicopter utilizing our helicopter landing gear unsafe warning system.

Referring to FIG. 1, we see a conventional, modern helicopter 10 which includes a fuselage 12 supported on double landing gear 14 and single landing gear 18. Pilot compartment 19 is located in fuselage 12 and includes control panel 21 and pilot collective blade pitch stick 23 which has electrically energized slip clutch 20 associated therewith. A radar altimeter 22 is located in a convenient position within helicopter 10 and warning or signal source 24 is preferably located in control panel 21. Switches 26, 28 and 30 are located one on each of the three landing gear 18 and 14.

Switches 26, 28 and 30 are conventional switches and may be of the type manufactured by the Micro-Switch Division of the Minneapolis Honeywell Corporation, Freeport, Illinois, and identified as part No. 1EN38–15.

Helicopter 10 may be of the type shown in U.S. Design Patent No. 197,823.

Radar altimeter 22 is of conventional design and of the type which produces both an altitude and a radar reliable signal. Such radar altimeters are commercially available, for example, the Honeywell Pulse-Rate Altimeter, Model HG 9010, manufactured by the Honeywell Corportion of Minneapolis, Minnesota. While a radar altimeter is shown, it should be borne in mind that any altitude measuring means could be used such as a sonic altimeter, laser device or light beam triangulation mechanism. If fully reliable altitude detection device is used, the reliability signal will not be necessary.

Sound source 24 is also of conventional design and commercially available, for example, part No. 1543–7 manufactured by Seaboard Electronics Corporation, Plainview, Long Island, New York. Sound source 24 preferably renders both a flashing visual signal and a 200 to 300 c.p.s. aural tone interrupted at 4 to 6 c.p.s. Clutch 20 and its associated mechanism is of conventional design and may be of the type manufactured by Clifton Precision Products Company, Inc. of Clifton Heights, Pennsylvania, and designated as their part No. Q-338.

The radar altimeter 22, the signal source 24, the collective stick 23 and the switches 26, 28 and 30 are electrically connected in a fashion now to be described to function as part of our helicopter landing gear unsafe warning system.

Referring to FIG. 2, we see conventional landing gear switches 26, 28 and 30. Each switch is open, deactivated or de-energized when the landing gear to which it is attached is down and locked so that the helicopter landing gear unsafe warning system is inoperative in this condition. When one of the landing gear 14 and 18 is not down and locked, its switch 26, 28 or 30 is closed and provides a 28-volt electrical source to solenoid-type relay 32 so as to close normally open switch 34, thereby providing a 28-volt electrical power source along electrical connection 36 to normally open switch 38. Switch 38 is caused to close when the radar altimeter is turned "on" or activated thereby energizing solenoid-type relay 40, to close switch 38 thereby providing the 28-volt electrical source to normally open switch 42. It will be noted that switch 44 is normally closed so that, once switch 42 is closed, the 28-volt electrical power source will be provide to signal source 24.

Switch 42 will be closed when a radar altimeter unreliable signal is provided to solenoid-type relay 50, thereby deactivating the relay to place switch 52 into contact with ground 54, thereby permitting the 28-volt electrical source to energize solenoid-type relay 56 and close switch 42 to activate the signal source 24, which is preferably an audio and a visual type of warning system. It will also be noted that when the radar unreliable signal deactivates relay 50, it opens switch 60 in electrical conduit 62.

It will accordingly be seen that the pilot will be given a warning signal when one of the landing gear is not down and locked and the radar altimeter is turned "on" and when the radar altimeter is rendering an unreliable signal.

It is also a function of our warning system 30 to provide a signal to the pilot when he descends below a preselected altitude and at least one of his landing gears is not down and locked. This is accomplished as a function of radar altimeter 22 which provides an electrical signal, such as a voltage proportional to the helicopter altitude or distance above the earth, through conduit 66 to comparator 70. An electric signal or voltage proportional to a preselected altitude is provided to comparator 70 through conduit 72, to be compared by comparator 70 with the actual altitude signal rendered by radar altimeter 22. Variable resistor 74 may be adjusted to change the preselected altitude. This preselected altitude could be, for example, 150 feet. Comparator 70 operates to send a signal to and hence energize solenoid-type relay 80 whenever the radar altimeter signal to comparator 70 is less than the preselected altitude signal provided to comparator 70 through conduit 72. This actuation of relay 80 closes normally open switch 82 and, with switch 52 in its upper position due to the energizing of relay 50 by a radar reliable signal through conduit 81, connects the 28-volt supply of relay 56 to ground 84. With switch 52 in its upper position and switch 82 in its lower position, relay 56 will accordingly be energized to close switch 42 and thereby energize signal source 24 to provide a signal to the pilot to indicate that the helicopter has descended below the preselected altitude and at least one of the landing gear is not down and locked. Comparator 70 may be of the type illustrated in Chapter 15 of the text "Pulse and Digital Circuits" by Jacob Millman and Herbert Taub and published by McGraw-Hill, New York, New York.

It is an important teaching of our helicopter landing gear unsafe warning system that if the signal source 24 is activated because the helicopter has descended below the preselected altitude the pilot may turn off the warning signal, for example, if he does not intend to land, in a fashion to place our system 30 into collective stick mode of operation so that a depression of the collective stick to lower the helicopter altitude will reactivate the warning system 30. The warning system 30 may be silenced by momentarily depressing reset or silencing button 90 in conduit 92, which energizes solenoid 94 to engage clutch 20 and also activates relay 96 to open normally closed switch 44 to deactivate signal source 24 and also to close normally open switch 98 to provide the 28-volt source from conduit 36 through conduit 100 to hold solenoid 94 and relay 96 in their activated condition when reset or silencing button 90 is released by the pilot. Our warning system 30 is now armed to operate in the collective stick mode. When the pilot lowers the collective stick 23 a preselected amount, which motion serves to reduce helicopter altitude, collective stick switch 102 is closed through the action of clutch 20 and mechanical linkage 104 so that, with switch 60 closed due to a reliable radar signal to relay 50, the 28-volt source from conduit 62 energizes relay 106 to open normally closed switch 108 thereby de-energizing relay 96 to open switch 98, to close switch 44, and de-energizing solenoid 94 to disengage clutch 20 permitting switch 102 to open as to be described hereinafter, thereby reactivating signal source 24 and placing system 30 back in the altitude mode of operation.

It is a feature of our warning system 30 that if the warning source 24 is energized or activated due to aircraft altitude below the preselected altitude, should the aircraft gain altitude and ascend above the preselected altitude, the warning system would automatically shut off because relay 80 would be de-energized to open switch 82 and thereby open switch 42 in conduit 36, assuming that a radar reliable signal is being provided to relay 50.

As previously described, if the radar altimeter 22 is providing an unreliable signal, or is inoperative, the pilot may silence the warning device by depressing silencing or reset button 90 since conduit 92 connects to conduit 62 in a position to be unaffected by open switch 60. This depression or resetting of silencing switch 90 energizes solenoid 94 and relay 96 which opens switch 44 and closes switch 98 thereby holding relay 96 and solenoid 94 energized. No further warning however, will be provided by the collective stick switch 102 because switch 60 is open. In this condition the pilot is not disturbed by a continuous warning signal, but yet, the radar altimeter is still on such that if it again becomes reliable the system will automatically return to the altimeter mode or collective stick mode of operation depending on the altitude at which the radar altimeter again becomes reliable.

If the altimeter is unreliable and the reset button has been depressed to silence the warning device and to engage the collective stick clutch, and if the altimeter becomes reliable again at an altitude below the preselected altitude, the warning device will be sounded by the lowering of the collective stick since the switch 60 will be closed.

If the altimeter becomes reliable after having been unreliable and silenced at an altitude above the preselected altitude, relay 50 will be actuated, disconnecting relay 56 from ground 54 at switch 52. Since relay 80 is not energized above the preselected altitude, switch 82 is open and relay 56 is de-energized, opening switch 42. The actuating voltage through conductor 36 through conductor 100 and switch 98 is lost to relay 96 and solenoid 94 and switch 44 is closed and switch 18 is opened placing the warning system in the altimeter mode of operation.

If it is desired that the warning system operate in the collective stick mode whenever the radar altimeter goes unreliable and the signal is silenced, switch 60 may be eliminated from the circuit so that conduit 62 will connect directly to the contact of switch 102.

Referring to FIG. 3 we see a schematic representation of the arrangement of clutch 20, collective stick 23 and collective stick switch 102. As previously described, when reset or silencing button 90 is depressed, relay 96 is activated to close switch 98 and provide a 28-volt source to energize solenoid 94 to engage clutch 20 so that shaft 104 will now be caused to rotate with collective stick 23. Shaft 104 carries internal adjustable switch cam 110, which actuates a pivot link 112 to close switch 102. It is important that when solenoid 94 is de-energized to release clutch 20, that cam 110 return to its original position so that switch 102 will again be closed by the same predetermined amount of motion in collective stick 23 when clutch 20 is re-engaged. This accurate return of cam 110 is accomplished by centering device 114 which includes the heart-shaped centering cam 116 positioned to receive spring loaded roller 118.

It is to be understood that this invention is not limited to the specific embodiment herein illustrated and described but may be used in other ways without departure from its spirit as defined by the following claims:

We claim:

1. In a helicopter landing gear unsafe warning system, an electrical power source activated by a landing gear unsafe signal, an electrically activated warning signal means, an interruptable electrical connection between said power source and said warning signal means, altitude responsive means actuatable to complete said electrical connection, override means actuatable to interrupt said conection, and collective pitch lever position responsive means actuatable to reestablish said connection.

2. Apparatus according to claim 1 and including altitude sensing means, and means responsive to altitude sensing means malfunction to complete said electrical connection.

3. Apparatus according to claim 1 wherein said altitude responsive means is responsive to altitude below a preselected limit.

4. Apparatus according to claim 2 and including means responsive to the activation of said altitude sensing means to complete said electrical connection.

5. In a helicopter landing gear unsafe warning system, an electrical power source, an electrically operating warning system source, an electrical connection between said power source and said warning system source, a radar altimeter connected to indicate helicopter height above earth surface, a first normally open switch in said electrical connection actuatable in response to a landing gear unsafe signal to a closed position, a second normally open switch in said electrical connection actuatable by a radar altimeter "on" signal to a closed position, a third normally open switch actuated by a radar altimeter signal to a closed position, a fourth switch in said electrical connection which is normally closed to complete the circuit between said electrical power source and said warning signal source when said first three normally open switches are actuated to their closed positions to place the warning system in altitude mode, a collective pitch stick, an electrically actuated clutch connected to said collective pitch stick, a reset button actuatable to open said normally closed switch and thereby deactivate said warning signal source and to also activate said clutch to place the warning system in collective stick mode, means responsive to collective pitch stick motion to deactivate said clutch and close said normally closed switch to reactivate said warning system source and place the warning system in altitude mode.

6. Apparatus according to claim 5 wherein said third normally open switch is also responsive to an altitude signal unreliable condition to close said normally open third switch.

7. Apparatus according to claim 5 including a comparator connected to receive an altitude signal from said radar altimeter, a preselected altitude signal connected to said comparator to produce a compared signal connected to actuate said third inwardly open switch to a closed position when said radar altimeter indicates an altitude below said preselected altitude.

8. In a helicopter landing gear unsafe warning system, an electrical power source, an electrically operating warning system source, an electrical connection between said power source and said warning system source, a radar altimeter connected to indicate helicopter height above earth surface, a first normally open switch in said electrical connection actuatable in response to a landing gear unsafe signal to a closed position, a second normally open switch actuated by a radar altimeter signal to a closed position, a third switch in said electrical connection which is normally closed to complete the circuit between said electrical power source and said warning signal source when said first two normally open switches are actuated to their closed positions to place the warning system in altitude mode, a collective pitch stick, an electrically actuated clutch connected to said collective pitch stick, a reset button actuatable to open said normally closed switch and thereby deactivate said warning signal source and to also activate said clutch to place the warning system in collective stick mode, means responsive to collective pitch stick motion to deactivate said clutch and close said normally closed switch to reactivate said warning system source and place the warning system in altitude mode.

9. In a helicopter landing gear unsafe warning system, means producing a landing gear unlocked signal, means producing a minimum safe altitude signal, a warning signal means activated by said landing gear unlocked signal and said altitude signal, a collective pitch stick, a pilot override system to deactivate said warning signal means, and means to reactivate said warning signal means in response to collective pitch stick movement.

10. In a helicopter, a helicopter landing gear unsafe warning system including an electrical power source and an electrically actuated signal source, an interruptable connection connecting said power source and said signal source and including a first, second, third and fourth switch, landing gear attached to said helicopter, switches attached to said landing gear to be actuated when said landing gear is not down and locked, means responsive to said landing gear switches to close said first switch when said landing gear is not down and locked, and altimeter connected when turned "on" to actuate said second switch and to produce a signal indicative of helicopter altitude and to also produce a signal indicative of radar reliability, adjustable signal means to indicate a preselected altitude signal, means to compare said altimeter altitude signal and said preselected altitude signal and to actuate said third switch when said comparator indicates that the altimeter altitude signal is below the preselected altitude signal, said fourth switch being normally closed so that said electrical power source will actuate said signal source when said first three switches are actuated to produce a warning signal responsive to altitude, means to open one of said switches when said altimeter malfunctions, a collective blade pitch stick and a clutch attached thereto, means to deactivate said warning signal when said first three switches are actuated comprising a reset button connected to open said fourth switch to deactivate said signal source and to activate said clutch, means attached to said clutch to reactivate said warning signal and to de-energize said clutch in response to collective pitch stick motion.

11. In a helicopter landing gear unsafe warning system, warning means, means to produce a landing gear unlocked signal, means to produce an altitude signal when the helicopter altitude is below a preselected limit, means responsive to said landing gear unlocked signal and to said altitude signal to activate said warning means, means to deactivate said warning means when the helicopter altitude is above the preselected limit, means to override said warning means after the warning means has been activated by the landing gear unlocked signal and the below preselected altitude signal, and means responsive to collective pitch movement to reactivate said warning means so overridden.

12. In a helicopter landing gear unsafe warning system comprising warning signal means operative to establish a first warning signal responsive to a preselected altitude signal and to a landing gear unsafe signal, and means to override said first warning signal and establish a second warning signal responsive to helicopter collective pitch stick position.

13. Apparatus according to claim 12 wherein said altitude signal is radar and including means responsive to a landing gear unsafe signal and a radar unreliable signal to actuate said first warning signal.

References Cited by the Examiner

UNITED STATES PATENTS

| 3,151,826 | 10/1964 | Michel | 244—17.17 X |
| 3,224,713 | 12/1965 | Pope | 244—102 |

FOREIGN PATENTS 52,272  8/1943  France.

MILTON BUCHLER, *Primary Examiner.*

LARRY C. HALL, *Examiner.*

A. E. CORRIGAN, *Assistant Examiner.*